Nov. 2, 1971  J. R. POPKIN  3,616,772
FLOAT AND METHOD OF MAKING SAME
Filed Sept. 12, 1969  3 Sheets-Sheet 2
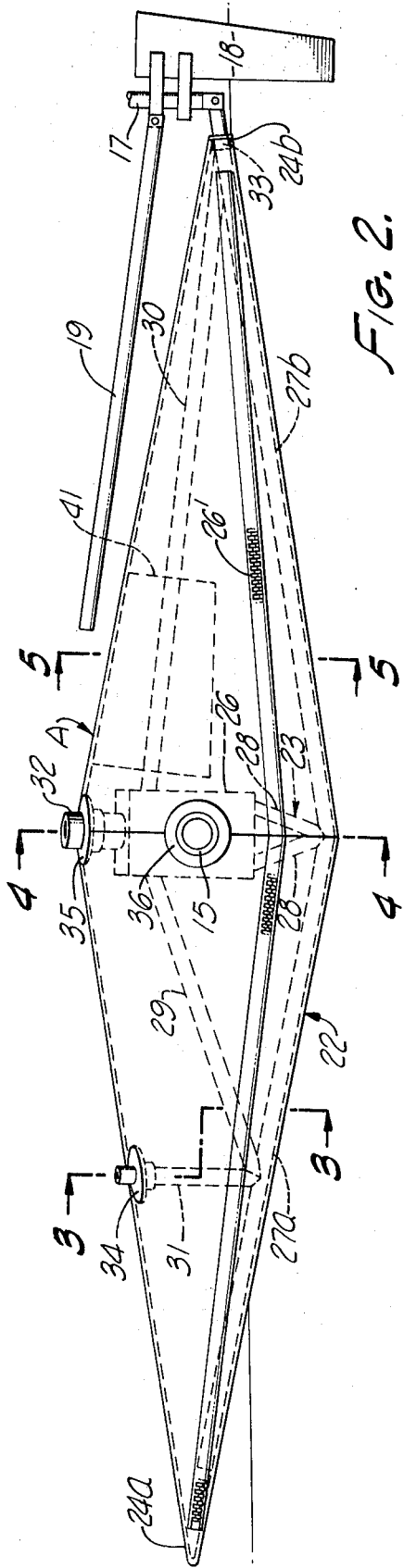
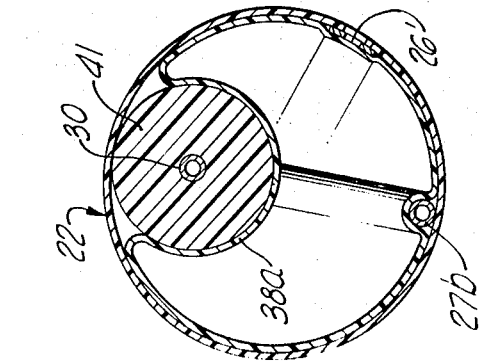
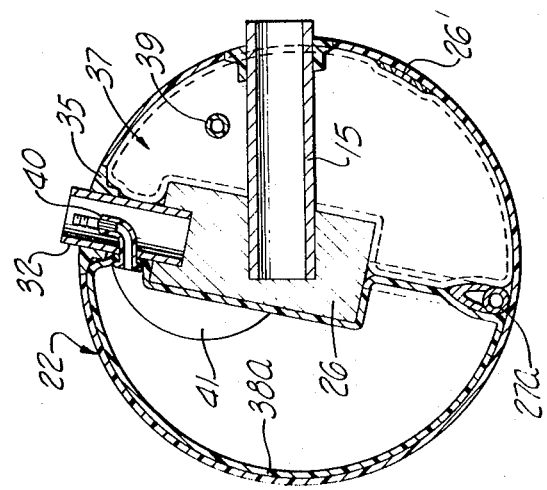
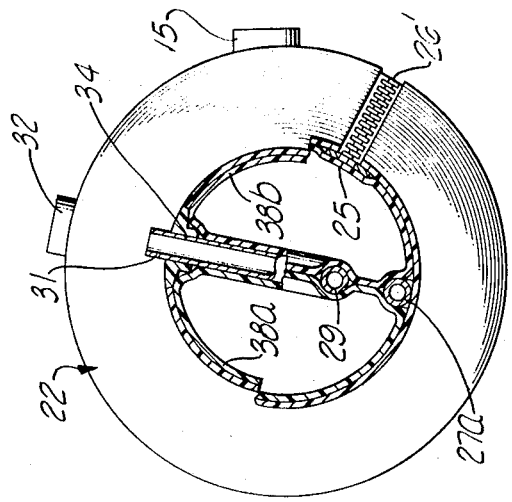
JOHN R. POPKIN
INVENTOR
WHANN & McMANIGAL
Attorneys for Applicant
BY

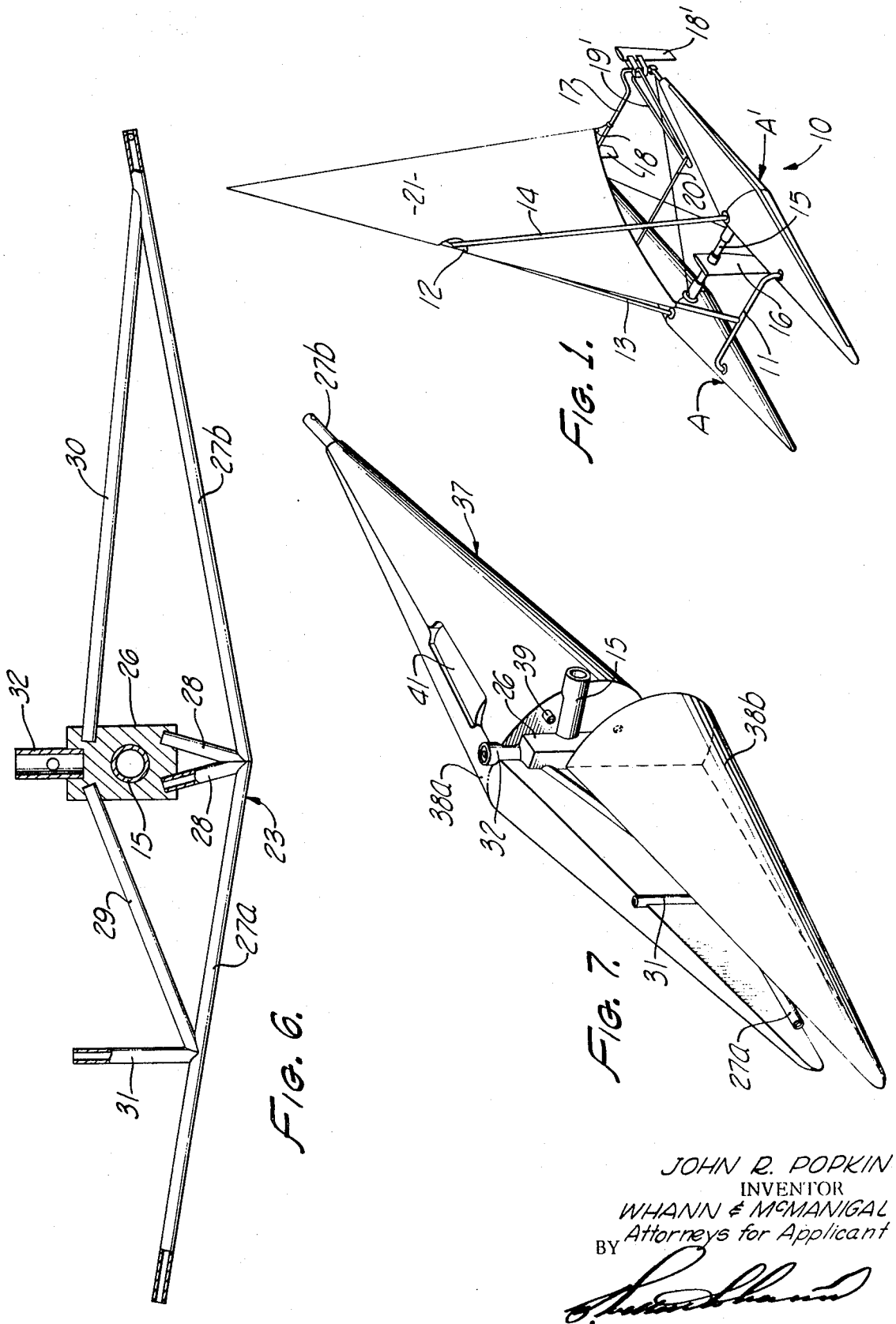

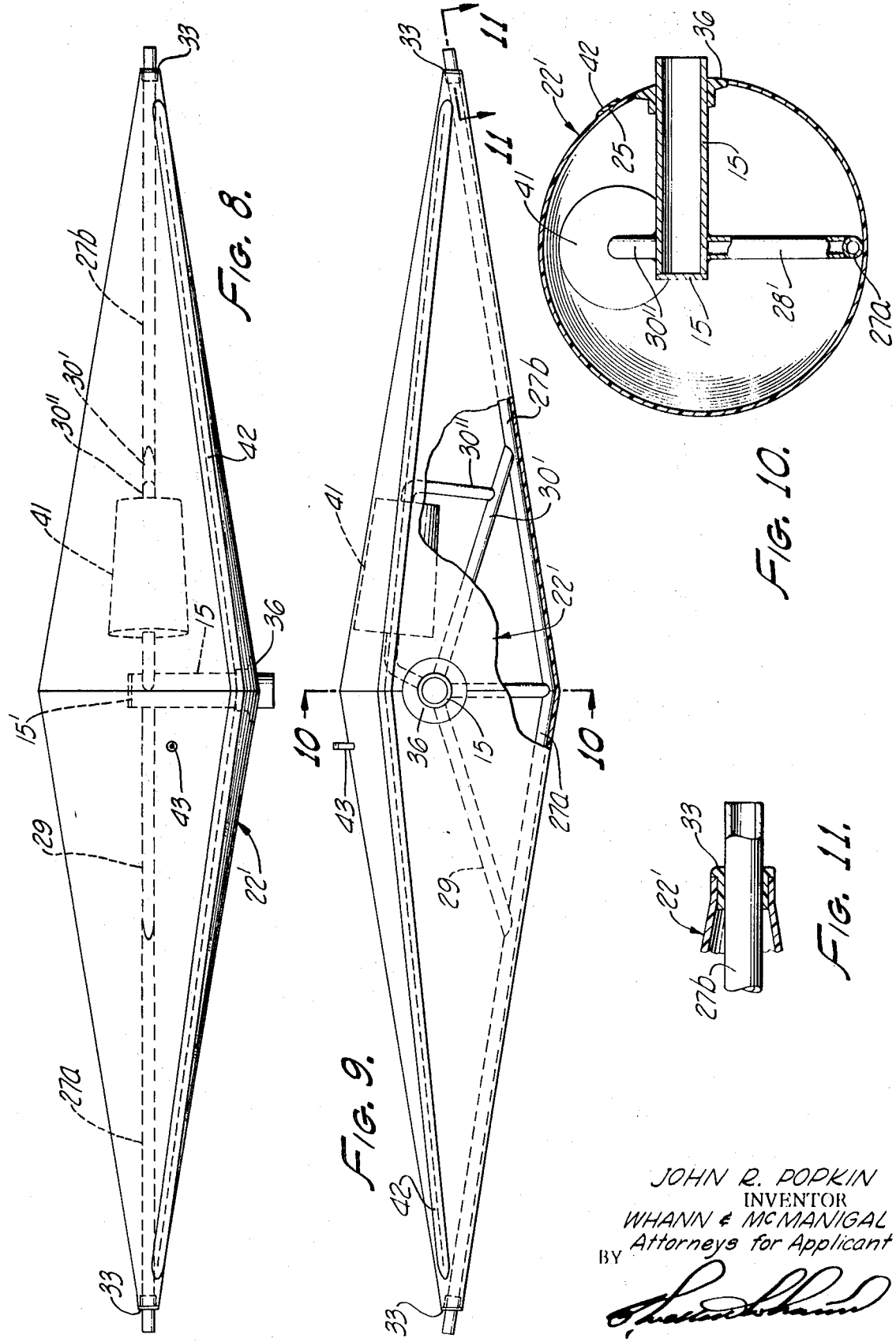

United States Patent Office

3,616,772
Patented Nov. 2, 1971

---

3,616,772
FLOAT AND METHOD OF MAKING SAME
John R. Popkin, 849 S. Normandie Ave., Apt. 104,
Los Angeles, Calif. 90005
Filed Sept. 12, 1969, Ser. No. 857,405
Int. Cl. B63b 7/08
U.S. Cl. 114—.5 F   1 Claim

ABSTRACT OF THE DISCLOSURE

An improved float structure which finds particular use as a support for water-borne vehicles, such as boats, aircraft, and the like, in which a rigid generally planar elongated skeletal frame structure is encased within a flexible envelope casing which can be sealed with flexible pliable buoyant means therein, or can be provided with one or more removable air filled bladders, the frame structure being characterized by an elongated member extending longitudinally along the bottom of the casing in a manner such that a load force receiving surface is provided with respect to the casing bottom.

BACKGROUND OF THE INVENTION

The present invention relates to the field of water buoyant float structures and their construction; and, while the invention lends itself to a variety of applications and uses, it is believed that the salient features of the invention will be clarified by discussing the same with respect to a specific application, namely, as a supporting medium or hull form in a boat structure.

With reference to boat hull structures, it may be noted that the forces acting on such hulls may be generally classified into two classes. In the first class are those forces which emanate by virtue of the water environment acting directly upon the hull, such as the static and dynamic water forces. In the second class are those forces which do not arise by virtue of the water environment acting directly upon the hull, as noted in the first class, but include such forces as weight loads, propulsion forces, rudder and center board forces, and the like.

Heretofore, consideration has been given to using a simple inflated longitudinal bag, or an assembly of a plurality of bags grouped together as a boat hull, but such an arrangement, although simple and of light weight construction, has the inherent disadvantage of being able to accept only token magnitudes of forces of the two classes before severe and undesirable bag or hull distortion occurs. Mast forces, in the case of a sail boat, for example, are especially great and concentrated, and require a rigid base structure to accept the forces. Also, weight loads on sail boats must be placed away from the center of the boat's buoyancy, to counteract the overturning and nose-diving moments imposed by the wind on the sail. A simple inflated structure would quickly buckle and distort, if the weight imposed on it were significantly dislocated from the center of buoyancy and dynamic support. Other forces of the two enumerated classes could also easily exceed the resisting capability of a simple inflated bag or plurality of bags.

In the herein described invention, the inherent disadvantages, as pointed out above, are completely eliminated by using in combination with the bag a single rigid longitudinally extending frame member of the order of one-half or more of the bag's length, and which lies along the bottom of the bag. When weight forces are applied to this frame member, the inflated bag will float above it at the same time as the frame member tends to lodge itself at the lowest point of the bag. When pressing against the bottom of the bag, this single rigid longitudinal frame member will secure the bag against the heavy lateral and vertical dynamic water forces, as well as against the vertical static water force. Of equal and possibly greater importance is the fact that this longitudinal frame member will accept the particularly heavy and individually concentrated loads of the second class of forces and will resolve these loads and distribute the resultant load over a length on the bag's bottom sufficient to avoid distortion.

Thus, in its most simple form, the present invention by utilizing only two components is able to provide a flexible hull structure with desirable high capabilities; the inflated bag providing the necessary buoyancy, and the rigid frame member providing the necessary support when it presses against the bottom of the bag.

SUMMARY OF THE INVENTION

The present invention relates generally to an improved float structure; and is more particularly concerned with float structures which are movable through a liquid medium such as water, and which may be utilized to provide buoyancy support means for water-borne vehicles or other objects.

It is one object of the herein described invention to provide a unique float structure of extremely light weight, which effectively utilizes an inflated bag and frame arrangement for resisting the effects of water environmental forces, and for also transferring weight and similar forces to the bag element.

A further object is to provide a float structure having buoyant means contained within an envelope casing, and an internal rigid frame structure having a frame member for transferring weight and other forces to the bottom of the casing, and in which the frame structure also includes at least one strut member connected with the casing for resisting twisting and distortions thereof.

Another object is to provide a float structure in which a flexible envelope casing removably houses an internal rigid frame structure and inflatable bladder means having movable sections or portions which can be placed in a position for embracing the frame structure.

It is also an object to provide a unique float arrangement embodying a pair of floats mounted at the ends of a common support axis, which includes a torque tube for resisting relative twisting movements of the floats.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only:

FIG. 1 is a perspective view of a water-borne vehicle, namely, a catamaran, which embodies float structures according to the present invention;

FIG. 2 is a side elevational view of one of the float structures;

FIG. 3 is a transverse sectional view through a forward portion of the float structure, taken substantially on line 3—3 of FIG. 2;

FIG. 4 is a central transverse sectional view, taken substantially on line 4—4 of FIG. 2;

FIG. 5 is an after sectional view, taken substantially on line 5—5 of FIG. 2;

FIG. 6 is a side view of the frame structure as utilized in the floats, and showing the cooperative relationship of the several frame members;

FIG. 7 is a perspective view showing the assembled frame structure and associated inflatable sectionalized bladders, one section of the bladder being displaced to show portions of the frame structure;

FIG. 8 is a top plan view of an alternative float construction to that shown in FIG. 2;

FIG. 9 is a side elevational view of the structure shown in FIG. 8, portions of the envelope casing being cut away to disclose portions of the interior frame structure;

FIG. 10 is a transverse midsectional view, taken substantially on line 10—10 of FIG. 9; and FIG. 11 is a fragmentary detail view at one end of the frame structure to show the manner of sealing the envelope casing, taken substantially on line 11—11 of FIG. 9.

DESCRIPTION OF THE SEVERAL EMBODIMENTS

Referring more specifically to the drawings, for illustrative purposes, the invention is shown as being embodied in a water-borne vehicle or boat structure, in this case a catamaran, as generally indicated by the numeral 10, and which comprises a pair of float structures A and A' which are constructed according to the present invention. In its general configuration, the catamaran is of conventional construction, the float structures being secured in spaced apart relation by means of a forward bridging frame member 11 which centrally supports a mast 12 between the floats, this mast being rearwardly inclined and laterally supported by bracing members 13 and 14 extending upwardly from each of the respective float structures. Immediately below and extending generally between the foot portions of the bracing members 13 and 14, the floats are interconnected by means of a torque tube 15 which carries a center board 16. At the after end of the float structures, the floats are connected by a rear bridging frame member 17 which serves as a pivotal support for twin rudders 18, 18' which are connected in each case to a tiller as indicated at 19, 19', the tillers for the respective rudders being interconnected by a cross-bar 20 for unitary operation. The sail 21 as carried by the mast is trimmed by being connected to the rear bridging frame member 17. It will be understood that the catamaran as described does not per se form a part of the invention and is described primarily for the purpose of illustrating one use for the float structures which embody the features of the present invention.

Referring more specifically to FIG. 2, one of the float structures, in this case float A, will be described in detail. It is believed unnecessary to describe the other float since the floats embody similar constructions and incorporate the same features.

Each of the float structures includes an envelope bag or casing, as generally indicated by the numeral 22, and a frame structure as generally indicated by the numeral 23.

The casing 22 is constructed of any suitable material. A plastic or rubber coated fabric is very well adapted for the purpose, and plastic coated nylon has been used as the casing material. The configuration of the casing may vary, depending upon the manner in which the float is to be utilized. As illustrated in FIG. 2, the casing is of tubular construction and tapers from a midpoint of greatest diameter to oppositely disposed pointed ends 24a, 24b. The casing is provided with a longitudinally extending opening 25 (FIG. 3) which extends substantially from one end of the casing to the other, and being provided with closure means such as a zipper, as indicated at 26'.

The frame structure 23 may likewise assume various configurations, and while the frame structure has been illustrated as being positioned internally of the casing 22, it is within the broad concept of the present invention that the frame structure may be positioned exteriorly of the casing.

As best shown in FIG. 6, the frame structure 23 is of skeletal form in which tubular frame members of suitable material, such as aluminum, plastic or other tubing are connected with a main tie-plate 26 in order to lie substantially in a common plane.

It is a feature of the frame structure that it includes bottom longitudinally extending lower frame members 27a and 27b which are arranged to conform generally to the bottom configuration of the casing and extend along the casing bottom to form a load receiving and applying structure with respect to the casing. In the present structure, in order to conform to the tapered casing end portions, the frame members 27a and 27b are upwardly inclined towards the bag ends. The frame members are spaced from the tie-plate 26 at their joined ends by means of short tubular spacers 28—28. As shown in FIG. 2, it will be observed that the frame member 27a is terminated short of the casing end 24a, while the frame member 27b is of sufficient length as to project beyond the casing end 24b so as to form a connection with the rudder supporting mechanism. The frame structure is additionally rigidified and strengthened by the provision of an angularly positioned brace member 29 which is connected at one end to the frame member 27a and at its other end to the tie-plate 26. A brace member 30 similarly connects between frame member 27b and the tie-plate. It will be observed that the brace members 29 and 30 are positioned below the top of the envelope casing. Spaced from the tie-plate 26 at the juncture of brace member 29 with frame member 27a, there is provided an upwardly extending strut 31 which is shown as being of sufficient length as to extend through the upper wall of the casing. This strut provides a support for one end of the forward bridging frame member 11, as shown in FIG. 1. Also extending upwardly from the tie-plate 26, there is provided a tubular member 32 which is of sufficient length to extend through the top of the casing. This member provides a support for the bracing member 13 as shown in FIG. 1. Also connected with the tie-plate 26 is a connection of one end of the torque tube 15, it being noted that the axis of the torque tube, as shown in FIG. 4, is at an angle to the plane of the frame structure 23. At the points where the frame member 27b, strut 31, tubular member 32, and the torque tube 15 pass through the casing wall, the casing wall is provided with sealing sleeves as respectively shown at 33, 34, 35, and 36.

In the arrangement described above, it will be appreciated that the torque tube 15, strut 31, and tubular member 32, by virtue of their extending through or being connected with the casing wall, serve to retain the casing against rotation about the contact axis of the bottom of the casing with the lower frame members 27a and 27b. This is an important feature, particularly where the floats are utilized in a sail boat, since there would be a tendency to shift the casing whenever the water strikes the casing surface obliquely.

In the embodiment shown in FIG. 2, it is proposed to utilize one or more inflatable bladders, as generally indicated by the numeral 37, and as best shown in FIG. 7. The configuration of the bladder structure may vary depending upon the type of float which is to be provided for a particular purpose. In the present instance, the bladder structure is arranged to conform with that of the float disclosed in FIG. 2. One or more bladders may be utilized, if desired, and the bladder or bladders may be fabricated of any suitable material. A number of conventionally available plastics, such as Mylar, and certain of the vinyls, are suitable for this purpose. By way of illustration, the bladder structure in the present instance is constructed to provide a main section 38a and a cooperating section 38b. The main section 38a is in this instance fabricated so that one portion of the bladder will completely fill one end of the casing 22, and the other end of the main section will fill one-half of the other end of the casing on one side of the frame structure, while the cooperating section 38b is shaped to fill the other end of this end of the casing. The main section 38a, and the cooperating section 38b will have their interiors permanently connected by an air flow tube 39. With this arrangement, it will be appreciated that with the bladder structure deflated, the main section 38a and cooperating section 38b may be positioned around the frame structure 23 in such a manner that it will be surrounded and embraced by the bladder structure when the bladder structure is inflated, which is made possible by providing a valve inflating stem connection 40 extending into the tubular member 32 as clearly shown in FIG. 4. When bladders are used to provide float buoyancy, the bladders under inflation will operate to cause the sleeve members 33, 34, 35, and 36 to sealingly grip their associated tubular frame members.

In some types of installations, as for example, when the float is used in a boat structure as shown in FIG. 1, it may be desirable to provide a seat support for the occupant. This may be done by using a cylindrical body structure, as indicated at 41, and which is supported on the brace member 30. This seat body is of sufficient diameter so that it extends outwardly to the top of the adjacent envelope casing 22.

The alternate arrangement, as shown in FIGS. 8 to 11, differs from the embodiment previously described primarily in that instead of utilizing separate bladders for the buoyant air, the alternate arrangement utilizes the casing as the air containing structure. As shown in FIG. 8, the casing, as indicated at 22′, instead of utilizing a zipper 26′ for closing the opening 25 of the casing, utilizes an elongate patch 42 for sealing the opening 25 after the frame structure is inserted.

The frame structure in this arrangement is also slightly changed. The lower frame member 27a, is in this case extended so as to project through the adjacent end of the casing in a similar manner to that in which the frame member 27b projects through the other end of the casing as shown in FIG. 11. Similarly, a sealing sleeve 33 is utilized.

The previous brace member 30 is here replaced by a brace member 30′ which is similar to the brace member 29, as previously explained, and an additional upstanding frame member 30″ which serves as a support for the seat body 41.

Moreover, instead of utilizing a tie-plate 26, the frame members are in this case connected directly to the torque tube 15, as shown in FIGS. 9 and 10.

In this arrangement, the casing is arranged to be inflated through a valved stem 43 mounted in the upper wall of the casing. Since the casing is inflated, it will, of course, be necessary to prevent the escape of air through the torque tube 15, and this may be done by capping the open end with a closure member 15′ as shown in FIG. 10. Also, it is preferable in this form of the invention to permanently seal the sleeves 33 and 36 so that the casing will be air-tight. Instead of utilizing air as the buoyant medium, it is within the broad concept of the invention, although not shown, to utilize a flexible packing material having buoyant characteristics. The use of an inflated casing, however, has an advantage in that the resulting float will be lighter and more distortion resistant by being firmer.

From the foregoing description and drawings, it will be clearly evident that the delineated objects and features of the invention will be accomplished.

Various modifications may suggest themselves to those skilled in the art without departing from the spirit of my invention, and hence, I do not wish to be restricted to the specific forms shown or uses mentioned except to the extent indicated in the appended claim.

I claim:
1. A float structure, comprising:
   (a) an elongated flexible water buoyant body structure including an outer envelope casing;
   (b) a rigid frame structure within said casing including an elongated frame member extending longitudinally along the bottom of the casing for transferring weight load forces thereto, and bracing frame members positioned along with said bottom frame member to occupy a common substantially vertical plane within said casing; and
   (c) inflated bladder means extending longitudinally of said casing and having lateral portions positioned on opposite sides of said plane, said bladder means including a plurality of interconnected inflatable sections adapted to removably embrace portions of said frame structure.

References Cited

UNITED STATES PATENTS

| | | | |
|---|---|---|---|
| 2,375,973 | 5/1945 | Cooper et al. | 114—66.5 F |
| 2,451,855 | 10/1948 | Mercier et al. | 9—2 A |
| 2,544,794 | 3/1951 | Kelley et al. | 114—66.5 F |
| 3,473,502 | 10/1969 | Wittkamp | 114—61 R |

ANDREW H. FARRELL, Primary Examiner

U.S. Cl. X.R.

114—61